ABSTRACT: This is the first page of a US patent. The title is "Hydraulic Control System in Automatic Transmission and Hydraulic Control Method in Same"...

United States Patent

Ishikawa et al.

Patent Number: 5,050,459
Date of Patent: Sep. 24, 1991

[54] HYDRAULIC CONTROL SYSTEM IN AUTOMATIC TRANSMISSION AND HYDRAULIC CONTROL METHOD IN SAME

[75] Inventors: Kazunori Ishikawa; Yasuhiro Kamei; Yutaka Taga; Kunihiro Iwatsuki, all of Aichi, Japan

[73] Assignees: Alsin-Aw Kabushiki Kaisha; Toyota Jidosha Kabushiki Kaisha, both of Japan

[21] Appl. No.: 510,191

[22] Filed: Apr. 17, 1990

[30] Foreign Application Priority Data

Apr. 19, 1989 [JP] Japan .................................. 1-99295

[51] Int. Cl.$^5$ ............................................. B60K 41/06
[52] U.S. Cl. ........................................ 74/867; 74/868; 74/869; 74/870
[58] Field of Search ................... 74/867, 868, 869, 870

[56] References Cited

U.S. PATENT DOCUMENTS

| | | | |
|---|---|---|---|
| 4,631,982 | 12/1986 | Miki et al. | 74/869 |
| 4,724,727 | 2/1988 | Shibayama et al. | 74/867 |
| 4,924,731 | 5/1990 | Hayakawa et al. | 74/867 |

FOREIGN PATENT DOCUMENTS 6367064 12/1988 Japan .

Primary Examiner—Leslie A. Braun
Assistant Examiner—William O. Trousdell
Attorney, Agent, or Firm—Lorusso & Loud

[57] ABSTRACT

In a hydraulic control system for an automatic transmission comprising a hydraulic servomotor C-2 for a clutch or brake adapted to engage and disengage necessary rotary components of a planetary gear mechanism, and a select valve for selectively supplying hydraulic pressure to the hydraulic servomotor C-2 dependent on two transmission states, the select valve has two input ports selectively supplied with hydraulic pressure dependent on the two transmission states and one output port for outputting hydraulic pressure to the hydraulic servomotor C-2, a first orifice is disposed between the output port and the hydraulic servomotor C-2, and a second orifice is disposed on the same side as either of the two input ports.

Upon an upshift from the 2nd to the 3rd speed in the D range condition, a shift valve is changed over such that the line pressure is supplied to one input port of the select valve via a line pressure output port and the second orifice to move a ball valve body in the select valve. Thus, the line pressure is supplied to the hydraulic servomotor C-2 via the output port of the select valve and the first orifice.

In the R range condition, a manual valve is changed over such that its ports p and d are communicated with each other, while its port a is blocked off. The line pressure is hence supplied from the line pressure output port to another input port of the select valve for moving the ball valve body, so that the line pressure is supplied to the hydraulic servomotor C-2 via the first orifice.

Therefore, at the time of an upshift from the 2nd to the 3rd speed, since the line pressure is supplied to the hydraulic servomotor C-2 while being restricted through both the second orifice and the first orifice, the clutch is gradually connected so as to prevent the occurrence of a shift shock. At the time of a shift into the reverse position, since the line pressure is supplied to the hydraulic servomotor C-2 while being restricted through only the first orifice, the clutch is more quickly connected so as to prevent a time lag in speed change.

4 Claims, 5 Drawing Sheets

|   | P | R | N | D | 2 | L |
|---|---|---|---|---|---|---|
| a | × | × | × | ○ | ○ | ○ |
| b | × | × | × | × | ○ | ○ |
| c | × | × | × | × | × | ○ |
| d | × | ○ | × | × | × | × |

Fig. 5

| POSITIONS | | SOLENOIDS | | | CLUTCHES | | | BRAKES | | | | ONE-WAY CLUTCHES | | |
|---|---|---|---|---|---|---|---|---|---|---|---|---|---|---|
| | | S1 | S2 | S3 | C1 | C2 | C0 | B1 | B2 | B3 | B0 | F1 | F2 | F0 |
| P | | ○(×) | × | × | × | × | ○ | × | × | × | × | × | × | × |
| R | | ○(×) | × | × | × | ○ | ○ | × | × | ○ | × | × | × | ○ |
| R (V 9) | | ○(×) | ○ | × | × | × | ○ | × | × | × | × | × | × | ○ |
| N | | ○(×) | × | × | × | × | ○ | × | × | × | × | × | × | × |
| D | 1 ST | ○ | × | × | ○ | × | ○ | × | × | × | × | × | ⊗ | ○ |
| | 2 ND | ○ | ○ | ◎ | ○ | × | ○ | × | ○ | × | × | ⊗ | × | ○ |
| | 3 RD | × | ○ | ◎ | ○ | ○ | ○ | × | ○ | × | × | × | × | ○ |
| | 4 TH | × | × | ◎ | ○ | ○ | × | × | ○ | × | ○ | × | × | × |
| 2 | 1 ST | ○ | × | × | ○ | × | ○ | × | × | × | × | × | ⊗ | ○ |
| | 2 ND | ○ | ○ | × | ○ | × | ○ | ○ | ○ | × | × | ○ | × | ○ |
| | 3 RD | × | ○ | ◎ | ○ | ○ | ○ | × | ○ | × | × | × | × | ○ |
| | (3 RD) | × | × | × | ○ | ○ | ○ | × | ○ | × | × | × | × | ○ |
| L | 1 ST | ○ | × | × | ○ | × | ○ | × | × | ○ | × | × | ○ | ○ |
| | 2 ND | ○ | ○ | × | ○ | × | ○ | ○ | ○ | × | × | ○ | × | ○ |
| | (1 ST) | × | × | × | ○ | × | ○ | × | × | ○ | × | × | ○ | ○ |

NOTE:
- ○ : ON / ENGAGED / LOCKED
- × : OFF / DISENGAGED / FREE
- ◎ : LOCK-UP CONTROL UPON ON/OFF
- ⊗ : FREE IN COAST CONDITION

Fig. 6

HYDRAULIC CONTROL SYSTEM IN AUTOMATIC TRANSMISSION AND HYDRAULIC CONTROL METHOD IN SAME

BACKGROUND OF THE INVENTION

The present invention relates to a hydraulic control system for controlling clutches or brakes adapted to engage or disengage an element of a planetary gear mechanism in an automatic transmission, and a hydraulic control method in the transmission.

Generally, in a hydraulic control system of an automatic transmission, hydraulic pressure is supplied to hydraulic servos or servomotors adapted to engage or disengage an element of a planetary gear mechanism by selectively changing over a plurality of shift valves. That supply of hydraulic pressure to the hydraulic servomotors is made through a single orifice. The diameter of this orifice is set to such size as to prevent the occurrence of a shift shock by abrupt pressure acting on the hydraulic servomotors, and also to avoid a time lag in speed change.

In the conventional hydraulic control system, however, since the supply of hydraulic pressure to the hydraulic servomotors of the clutches or brakes is made through the single orifice, it may happen that prevention of both the shift shock and the time lag cannot be achieved concurrently, when using one certain clutch or brake for different transmission stages. For example, if the orifice diameter is set so as to prevent the shift shock upon an upshift from the 2nd to the 3rd speed in a direct clutch which is engaged or connected in the forward 3rd or more speed and the reverse condition, a problem occurs in that the hydraulic pressure is restricted excessively at the orifice and hence the time lag in speed change is caused upon a shift to the reverse condition.

SUMMARY OF THE INVENTION

To solve the problem as mentioned above, it is an object of the present invention to provide a hydraulic control system in an automatic transmission which can achieve prevention of both a shift shock and a time lag concurrently, when using a clutch or brake for different transmission stages.

Therefore, a hydraulic control system in an automatic transmission of the present invention comprises a frictional engaging element for engaging and disengaging an element of a planetary gear mechanism; a hydraulic servo for operating the frictional engaging elements; a shift change means connected to the hydraulic servo for supplying a hydraulic fluid to the hydraulic servo and draining a hydraulic fluid therefrom; a select valve for selectively supplying a hydraulic fluid to the hydraulic servo through the shift change means, said select valve having a first input port connected to the shift change means for supplying a hydraulic fluid thereto in a forward condition, a second input port connected to the shift change means for supplying a hydraulic fluid thereto in a reverse condition, and a output port connected to the hydraulic servo for supplying a hydraulic fluid thereto and selectively communicating with one of the first and second input ports in response to the forward condition and reverse condition; and an orifice means provided between the first input port provided in the select valve and the shift change means for supplying a hydraulic fluid to the first input port in the forward condition less than that to the second input port in reverse condition; whereby said orifice means prevents from a shock in the forward condition.

DESCRIPTION OF THE PREFERRED EMBODIMENT

Hereinafter, a preferred embodiment of the present invention will be described in detail with reference to the drawings.

To begin with, one example of an automatic transmission in which the present invention is employed will be described by referring to FIGS. 1 through 4.

Figure 1:
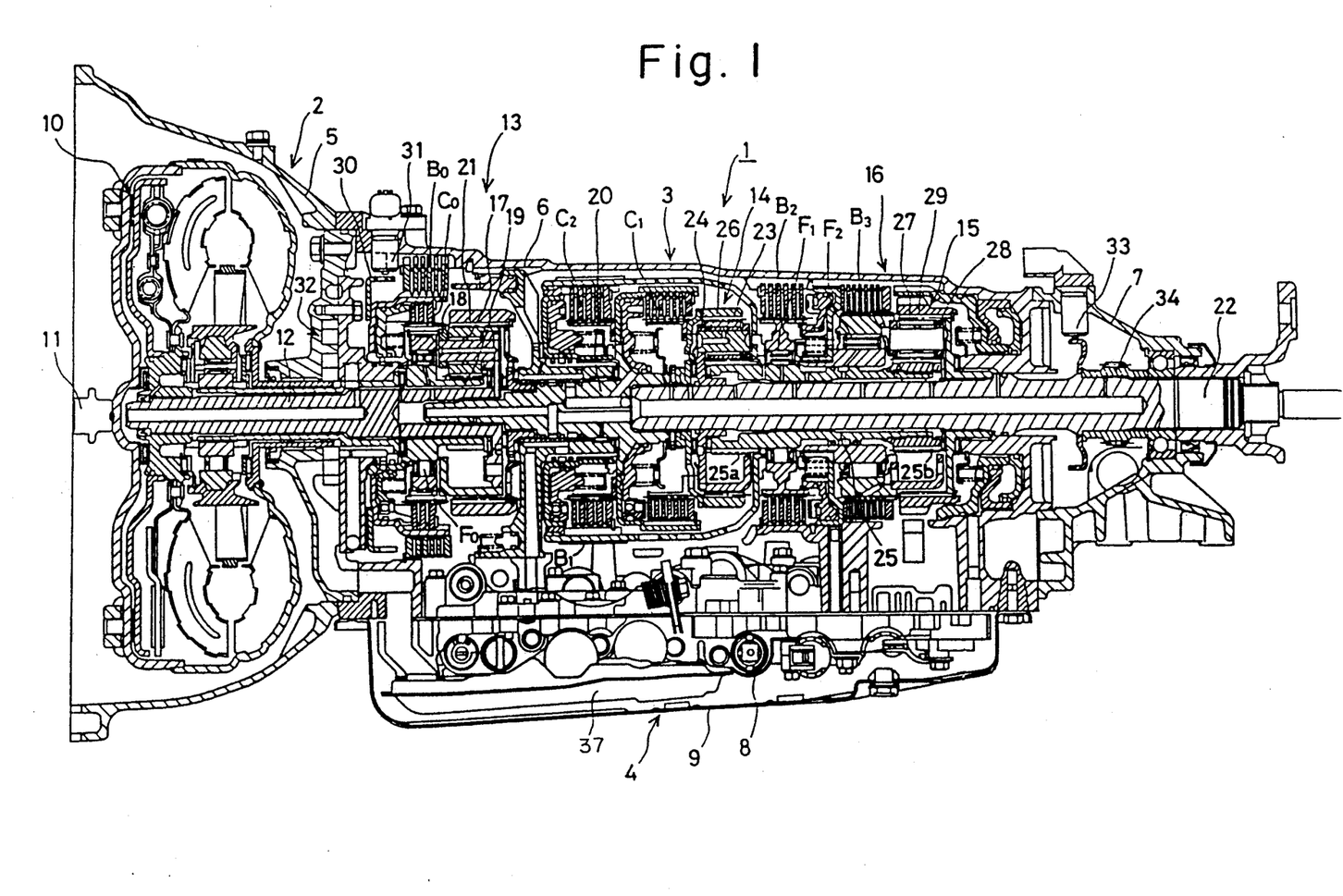
FIG. 1 is an entire sectional view of an automatic transmission to which the present invention is applied.
Figure 2:
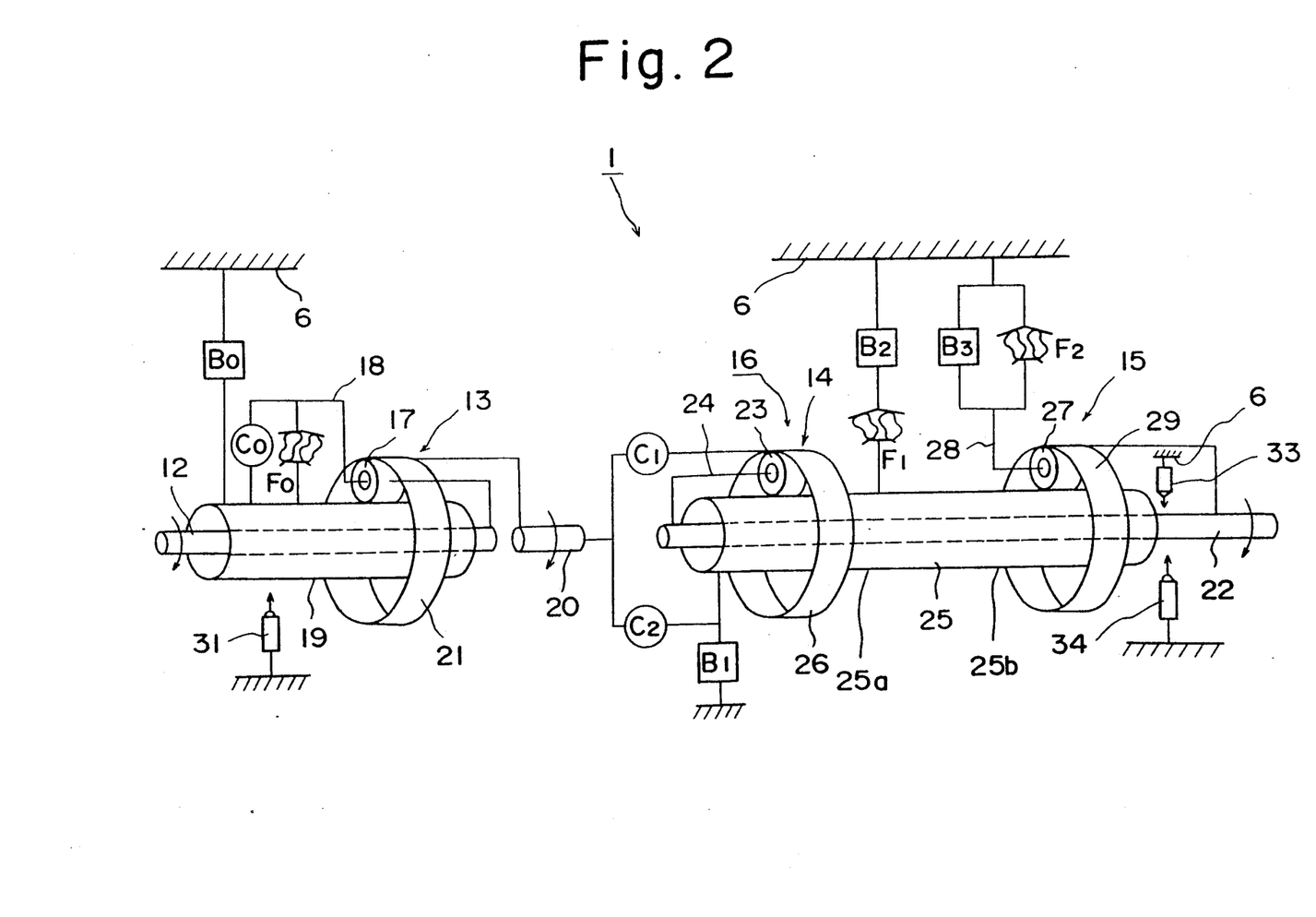
FIG. 2 is a diagrammatic view showing the construction of the automatic transmission.

As shown in FIGS. 1 and 2, an automatic transmission 1 comprises a torque converter 2, a planetary transmission gear mechanism 3 and a hydraulic control system 4 which are housed in a converter housing 5, a transmission case 6 and an extension housing 7, and a valve body 8 and an oil pan 9, respectively.

The torque converter 2 includes a lock-up clutch 10 for increasing the efficiency of power transmission, and transmits rotative power or torque of an input member 11 to an input shaft 12 of the transmission gear mechanism 3 indirectly through a flow of working fluid within the torque converter 2, or directly with connection of the lock-up clutch 10.

The transmission gear mechanism 3 comprises an overdrive planetary gear unit 13 and a main transmission unit 16 comprising a front planetary gear unit 14 and a rear planetary gear unit 15.

The overdrive planetary gear unit 13 consists of a carrier 18 connected to the input shaft 12 and supporting a planetary pinion 17, a sun gear 19 surrounding the input shaft 12, and a ring gear 21 coupled to an input shaft 20 of the main transmission unit 16. An overdrive direct clutch $C_0$ and a one-way clutch $F_0$ are disposed in parallel to each other between the carrier 18 and the sun gear 19. Accordingly, the power transmission between the carrier 18 and the sun gear 19 is performed through the overdrive direct clutch $C_0$ when the clutch $C_0$ is operated, and through the one-way clutch $F_0$ only in one direction when the clutch $C_0$ is not operated. Further, an overdrive brake $B_0$ is disposed between the sun gear 19 and the transmission case 6.

Then, the front planetary gear unit 14 consists of a carrier 24 connected to an output shaft 22 and supporting a planetary pinion 23, a sun gear $25a$ constituted by a joint member 25 surrounding the output shaft 22 to be integrally with a sun gear $25b$ of the rear planetary gear unit 15, and a ring gear 26 coupled to the input shaft 20 through a forward clutch $C_1$. Furthermore, a direct clutch $C_2$ is interposed between the input shaft 20 and the sun gear $25a$, and a second coast brake $B_1$ comprising a hand brake is interposed between the sun gear 25a and the transmission case 6, respectively. Between the sun gear 25a and the transmission case 6, a second brake $B_2$ comprising multiple plates is also disposed through a one-way clutch $F_1$.

The rear planetary gear unit 15 consists of a carrier 28 supporting a planetary pinion 27, a sun gear 25b, and a ring gear 29 directly coupled to the output shaft 22. A 1st and Rev brake $B_3$ and a one-way clutch $F_2$ are disposed in parallel to each other between the carrier 28 and the transmission case 6.

In addition, an overdrive brake $B_0$ is disposed between the sun gear 19 and the transmission case 6. An annular flange 30 extending outwardly in the radial direction is fixed to the sun gear 19. The flange 30 has formed therein a number of holes or notches, and the transmission case 6 is provided with a speed sensor 31 of the contactless type utilizing light, magnetism or the like and disposed in opposite relation to the holes or notches. This speed sensor 31 detects a rotational speed of the flange 30 integral with the input shaft 12 when the overdrive direct clutch $C_0$ is connected, i.e., in the 1st, the 2nd and the 3rd speed condition. Incidentally, reference numeral 32 designates a hydraulic pump.

Meanwhile, in the extension case 7 there are installed a vehicle speed sensor 33 for detecting a rotational speed of the output shaft 22 to be used as a control parameter in an electronic controller such as ECU or ESC, for example, and a revolution number detecting gear 34 for taking out the number of revolutions of the output shaft 22 to transmit the vehicle speed to a tachometer. Output signals from both the sensors 31, 33 are sent along with output signals from other sensors to the controller, which controls solenoid valves $S_1$, $S_2$, $S_3$, $S_4$ of the hydraulic control system 4 (see FIG. 3) based on those output signals.

Next, the hydraulic control system 4 will be described with reference to FIG. 3.

Figure 3:
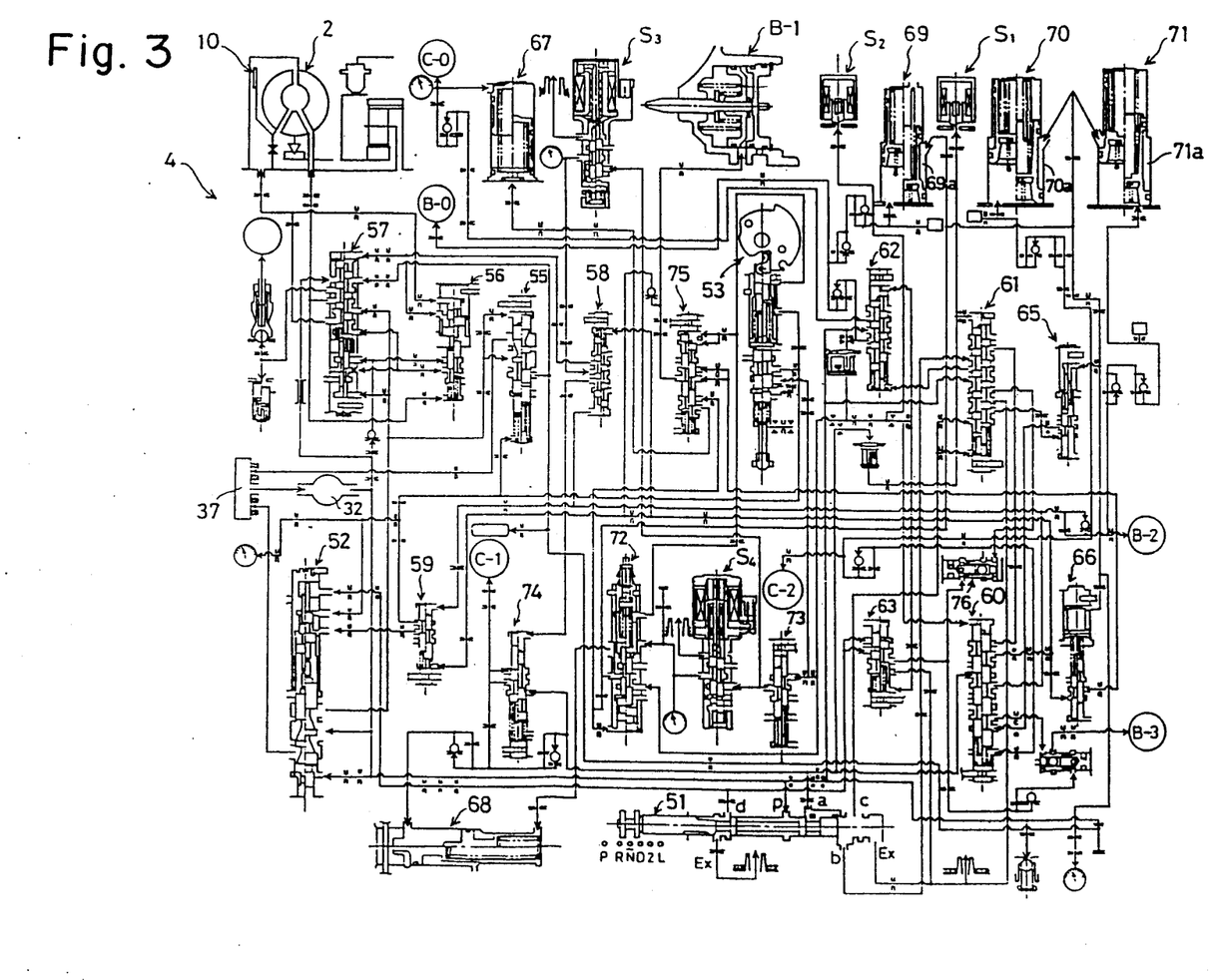
FIG. 3 is a circuit diagram showing a hydraulic control system of the automatic transmission.
Figure 4:
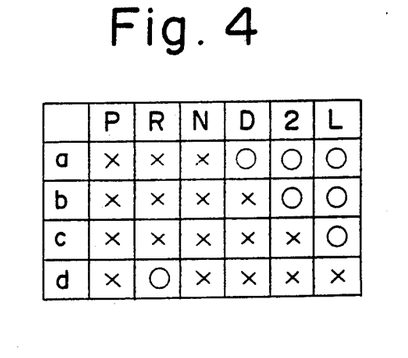
FIG. 4 is a table for explaining the operation of manual valves in the respective ranges.

In FIG. 3, designated by C-0, C-1, C-2 are hydraulic servomotors of the aforesaid respective clutches, and B-0, B-1, B-2, B-3 are hydraulic servomotors of the aforesaid respective brakes. Note that 2 is a torque converter, 32 is a hydraulic pump, and 37 is a strainer.

Designated by 51 is a manual valve operated by a driver for making a shift change in speed, and is coupled via a push-pull cable to a shift lever in the vicinity of a driver's seat. Dependent on movement of the shift lever, the manual valve is shifted to any of P, R, N, D, 2nd and L positions so that a line pressure port p is communicated with one or more of respective ports a, b, c and d as indicated by ○ in FIG. 4.

Designated by 52 is a primary regulator valve for regulating the line pressure on the basis of the throttle modulator pressure and the line pressure in the reverse condition, and then supplying the working fluid thus regulated in pressure to a lock-up relay valve 57 and a secondary regulator valve 55 both described later.

Designated by 53 is a throttle valve which compresses upper and lower two springs dependent on the degree of tread of an accelerator pedal to produce a throttle pressure corresponding to an output of the engine, cooperatively with the cut-back pressure from a cut-back valve 59 described later.

The secondary regulator valve 55 regulates the hydraulic pressure from the primary regulator valve 52 into a lubricating hydraulic pressure that is supplied to a lockup relay valve 57.

Designated by 56 is a lock-up control valve which regulates the hydraulic pressure imposed on the valve end of a lock-up relay valve 57. Also, the lock-up relay valve 57 is operated with the signal hydraulic pressure from a linear solenoid valve $S_3$ and a solenoid relay valve 58 for connecting and disconnecting the lock-up clutch 10 of the torque converter 2.

The cut-back valve 59 causes the cut-back pressure to act on the throttle valve 53 for regulating the throttle pressure. The cut-back valve 59 is operated with the hydraulic pressures supplied to the second coast brake $B_1$ and the second brake $B_2$ in the ranges other than the L or R range.

Designated by 60 is a 1-2 shift valve for making a shift between the 1st speed and the 2nd speed, and is supplied at its distal end with the hydraulic pressure from the solenoid valve $S_2$. The 1-2 shift valve 60 takes a right-half position as shown in the 1st speed condition, and a left-half position as shown in the 2nd, the 3rd and the 4th speed condition. More specifically, with the 1-2 shift valve 60 being at the right-half position in the 1st speed condition, the supply of hydraulic pressure to the second coast brake $B_1$ and the second brake $B_2$ is stopped at all times during that condition, and the hydraulic pressure is supplied to the 1st and Rev brake $B_3$ only during the L range. When entering the 2nd speed condition, the 1-2 shift valve 60 now takes the left-half position so that the hydraulic pressure from the manual valve 51 is supplied to the second brake $B_2$. In the 2nd and L ranges, the 1-2 shift valve 60 receives the hydraulic pressure from a 2-3 shift valve described later and supplies it to the second coast brake $B_1$ through a second coast modulator valve 66.

Designated by 61 is a 2-3 shift valve for making a shift between the 2nd speed and the 3rd speed, and is supplied at its distal end with the hydraulic pressure from the solenoid valve $S_1$. The 2-3 shift valve 61 takes a right-half position as shown in the 1st and the 2nd condition, and a left-half position as shown in the 3rd and the 4th speed condition. Specifically, the supply of hydraulic pressure to the direct clutch $C_2$ is stopped in the 1st and the 2nd speed condition, but allowed upon coming into the 3rd speed condition where the valve 61 takes the left-half position.

Then, designated by 62 is a 3-4 shift valve for making a shift between the 3rd speed and the 4th speed, and is supplied at its distal end with the hydraulic pressure from the solenoid valve $S_2$. The 3-4 shift valve 62 takes a right-half position as shown in the 1st, the 2nd and the 3rd speed condition, and a left-half position as shown in the 4th speed condition. Specifically, the supply of hydraulic pressure to the overdrive direct clutch $C_0$ is allowed in the 1st, the 2nd and the 3rd speed condition, but stopped upon coming into the 4th speed condition where the valve 62 takes the left-half position. On the other hand, the supply of hydraulic pressure to the overdrive brake $B_0$ is stopped in the 1st, the 2nd and the 3rd speed condition, but allowed in the 4th speed condition.

Designated by 63 is a reverse inhibit valve which is operated upon the solenoid valve $S_2$ being relieved when the vehicle speed is above 9 km/h, for example, thereby stopping the supply of hydraulic pressure to the direct clutch $C_2$. Further, 65 is a low coast modulator valve and 66 is a second coast modulator valve, both of which are operated when placing engine brake.

The aforesaid hydraulic servomotors C-0, C-1, C-2, B-0, B-2 are each provided with an accumulator. Specifically, designated by 67 is an accumulator for $C_0$, 68 is an accumulator for $C_1$, 69 is an accumulator for $B_0$, 70 is an accumulator for $C_2$, and 71 an accumulator for $B_2$. An accumulator control valve 72 is provided for regulating the hydraulic pressure communicated with respective back pressure chambers $69a$, $70a$, $71a$ of the accumulator 69 for $B_0$, the accumulator 70 for $C_2$ and the accumulator 71 for $B_2$, and also regulating the hydraulic pressures supplied to the low coast modulator valve 65 and the second coast modulator valve 66.

Further, designated by $S_1$ and $S_2$ are solenoid valves for controllably changing over the 1-2 shift valve 60, the 2-3 shift valve 61, and the 3-4 shift valve 62 as mentioned above. $S_3$ and $S_4$ are linear solenoid valves to which the hydraulic pressure regulated by the solenoid modulator valve 73 is supplied. In addition, 74 is an orifice control valve, 75 is cut-off valve, and 76 is a three-way valve (select valve) for automatically changing over the line pressure supplied in the 3rd or more speed condition in the D range and the line pressure supplied in the R range from one to the other.

Figure 5:
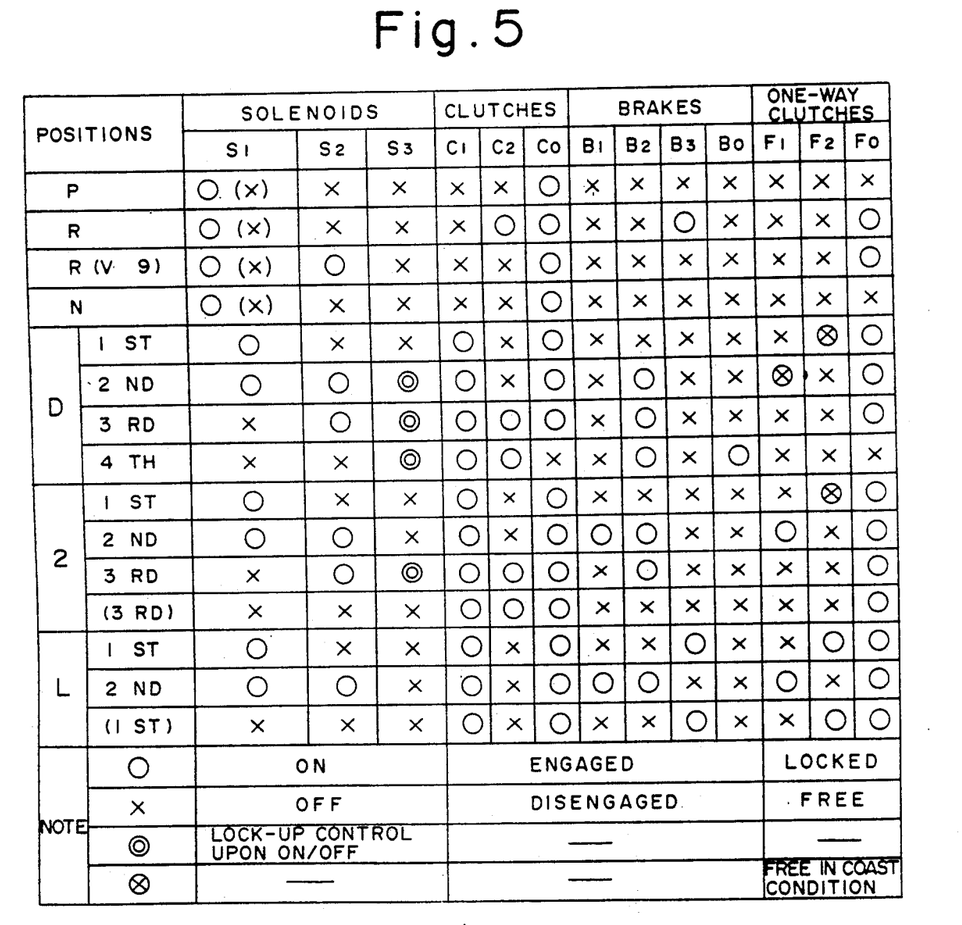
FIG. 5 is a table for showing the operative condition of solenoid valves, clutches, brakes and one-way clutches in the respective ranges.

Here, the solenoid valves $S_1$, $S_2$, $S_3$, the clutches $C_0$, $C_1$, $C_2$, the brakes $B_0$, $B_1$, $B_2$, $B_3$, and the one-way clutches $F_0$, $F_1$, $F_2$ in the automatic transmission 1 are controlled in the P, R, N, D, 2nd and L positions as indicated in a working table of FIG. 5.

The clutches $C_0$, $C_1$, $C_2$ and the brakes $B_0$, $B_2$, $B_3$ are controlled in accordance with the on/off combinations of the above three solenoid valves, and any of the shift ranges is set by operating the manual valve 51 provided in the hydraulic control system 4.

First, there will be described the case of the manual valve 51 being set in the D range.

In the 1st speed condition, the transmission is controlled such that the overdrive direct clutch $C_0$ and the forward clutch $C_1$ are connected, while the other clutches and brakes are held in a disconnected or released state. Accordingly, the overdrive planetary gear unit 13 is brought into a directly coupled state together through the overdrive direct clutch $C_0$, whereby the rotation of the input shaft 12 is directly transmitted to the input shaft 20 of the main transmission unit 16. In the main transmission unit 16, the rotation of the input shaft 20 is transmitted to the ring gear 26 of the front planetary gear unit 14 through the forward clutch $C_1$, and further transmitted to the carrier 24 and then the output shaft 22 integral with the carrier 24 for applying counterclockwise torque to the carrier 28 of the rear planetary gear unit 15 through the sun gear $25b$. However, the one-way clutch $F_2$ prevents the carrier 28 from rotating in the counterclockwise direction so that the carrier 28 will not rotate. As a result, the planetary pinion 27 is caused to rotate about its axis for transmitting the power to the ring gear 29 integral with the output shaft 22.

Note that the one-way clutch $F_0$ is operated to come into a connected state for the rotation of the carrier 18 in the above condition. The one-way clutch $F_2$ becomes free in the coast condition.

In the 2nd speed condition, the transmission is controlled such that the overdrive direct clutch $C_0$, the forward clutch $C_1$ and the second brake $B_2$ are connected or engaged, while the other clutches and brakes are held in a disconnected or released state. Accordingly, since the overdrive planetary gear unit 13 is held in a directly coupled state, the rotation of the input shaft 12 is directly transmitted to the input shaft 20 of the main transmission unit 16 as with the 1st speed condition. In the main transmission unit 16, the rotation of the input shaft 20 is transmitted to the ring gear 26 of the front planetary gear unit 14 through the forward clutch $C_1$ for applying counterclockwise torque to the sun gear $25a$ through the planetary pinion 23. However, since the second brake $B_2$ is engaged, the one-way clutch $F_1$ prevents the sun gear $25a$ from rotating in the counterclockwise direction so that the sun gear $25a$ will not rotate. As a result, the carrier 24 is rotated and the 2nd speed rotation is transmitted to the output shaft 22 via only the front planetary gear unit 14.

Note that the one-way clutch $F_1$ becomes free in the coast condition.

In the 3rd speed condition, the transmission is controlled such that the overdrive direct clutch $C_0$, the forward clutch $C_1$, the direct clutch $C_2$ and the second brake $B_2$ are connected or engaged, while the other clutches and brakes are held in a disconnected or released state. Accordingly, the overdrive planetary gear unit 13 is held in a directly coupled state, and the front planetary gear unit 14 of the main transmission unit 16 is brought into a directly coupled state together by connection of both the forward clutch $C_1$ and the direct clutch $C_2$, whereby the rotation of the input shaft 20 is directly transmitted to the output shaft 22.

In the 4th speed condition, i.e., at the highest shift stage, the transmission is controlled to be changed over such that the forward clutch $C_1$, the direct clutch $C_2$ and the second brake $B_2$ are held in a connected or engaged state, while the overdrive direct clutch $C_0$ is disconnected and the overdrive brake $B_0$ is engaged. The other brakes are controlled to remain in a released state.

Under this condition, the rotation of the sun gear 19 is prevented by the overdrive brake $B_0$ and the one-way clutch $F_0$ is operated to allow the rotation of the carrier 18, whereby the rotation of the carrier 18 is transmitted to the ring gear 21 and the input shaft 20 while being increased in speed through the planetary pinion 17. The ring gear 21 and the input shaft 20 are thus brought into an overdrive state. On the other hand, since the main transmission unit 16 is held in a directly coupled state, the overdrive rotation of the input shaft 20 is directly transmitted to the output shaft 22 so that output shaft 22 is also brought into an overdrive state.

Meanwhile, downshifts are performed as follows. In the case of the 4th-3rd downshift, the overdrive direct clutch $C_0$ is connected and the overdrive brake $B_0$ is released. Further, in the case of the 3rd-2nd downshift, the direct clutch $C_2$ is released and in the case of 2nd-1st downshift, the second brake $B_2$ is released.

In this connection, when the driver operates the manual valve for a downshift to the 2nd speed while running at the D range, the second coast brake $B_1$ is brought to connect at an earlier time to prevent the vehicle from coasting along at the time of downshift, so that the driver may be kept from feeling blank while running.

Next, operation in the case of the manual valve 51 being set in the 2nd range will be described.

In the case of the 2nd range, the transmission operates as with the case of the foregoing D range in the 1st and the 3rd speed condition. Therefore, the operation in the 1st and the 3rd speed condition is not explained here.

In the 2nd speed condition, the transmission is controlled such that the second coast brake $B_1$, as well as the forward clutch $C_1$, the overdrive direct clutch $C_0$ and the second brake $B_2$ are connected or engaged.

Under this condition, since the brake $B_1$ is actuated, the sun gears $25a$, $25b$ of the main transmission unit 16 is locked so as to effect the engine brake.

In this connection, when the driver performs an upshift from the 1st to the 2nd speed while running at the 2nd range, the second coast brake $B_1$ is delayed in its connection to avoid the second brake $B_2$ and the second coast brake $B_1$ from being engaged at the same time, thereby reducing a shock imposed on the driver at the time of the upshift.

Next, the case of the manual valve 51 being set in the L range will be described.

In the case of the L range, the transmission operates as with the case of the foregoing 2nd range in the 2nd speed condition. Therefore, the operation in the 2nd speed condition is not explained here.

In the 1st speed condition, the transmission is controlled such that the 1st and Rev brake $B_3$, as well as the forward clutch $C_1$ and the overdrive direct clutch $C_0$ are connected or engaged. The carrier 28 of the rear planetary gear unit 15 is thereby locked so as to effect the engine brake.

Next, the case of the manual valve 51 being set in the R range will be described.

The transmission is controlled such that the overdrive direct clutch $C_0$, the direct clutch $C_2$ and the 1st and Rev brake $B_3$ are connected or engaged, while the other clutches and brakes are held in a disconnected or released state. Accordingly, the overdrive planetary gear unit 13 is brought into a directly coupled state and the rotation of the input shaft 12 is directly transmitted to the input shaft 20 of the main transmission unit 16. In the main transmission unit 16, the rotation of the input shaft 20 is directly transmitted to the sun gears $25a$, $25b$ through the direct clutch $C_2$. Then, since the rotation of the carrier 28 is locked by the 1st and Rev brake $B_3$, the rotation of the sun gears $25a$, $25b$ is transmitted to the ring gear 29 through the planetary pinion 27 in the backward direction, so that the output shaft 22 is rotated backwardly.

In addition, the transmission is arranged such that when the vehicle speed is above a predetermined speed, e.g., 9 km/h, the direct clutch $C_2$ cannot be connected even with the manual valve 51 being operated into the R range. This permits to surely prevent the output shaft 22 from into a state of rotating backwardly while running at above the predetermined speed.

Next, one embodiment of the hydraulic control system in the automatic transmission of the present invention will be described.

Figure 6:
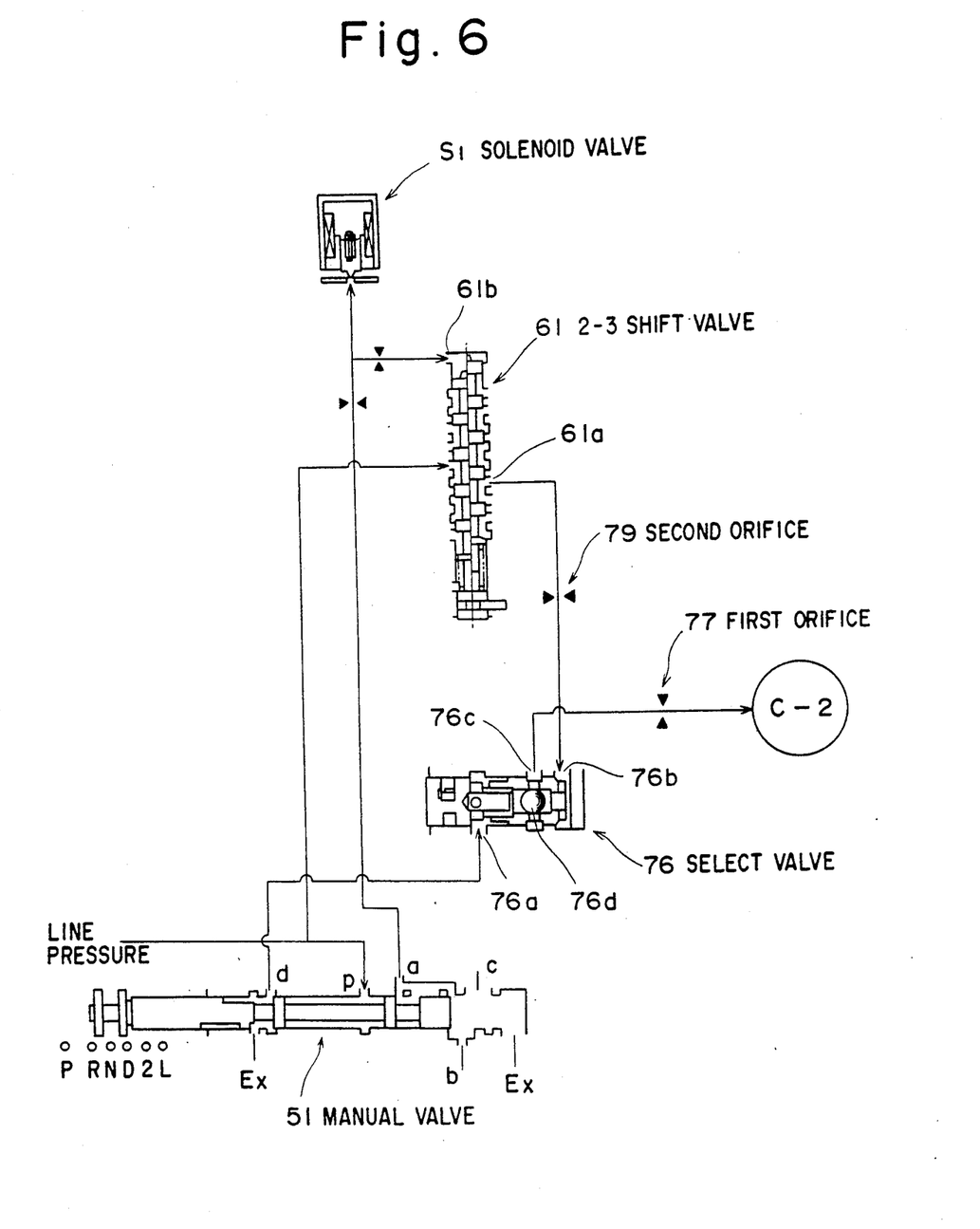
FIG. 6 is a hydraulic circuit diagram of the hydraulic control system in the automatic transmission for illustrating one embodiment of the present invention.

FIG. 6 shows only a hydraulic circuit relating to the hydraulic servomotor C-2 of the direct clutch in FIG. 3. Incidentally, the reverse inhibit valve 63 is omitted in FIG. 6.

As mentioned before, the present invention includes the select valve 76 for automatically changing over the line pressure supplied in the 3rd or more speed condition in the D range and the line pressure supplied in the R range from one to the other. One input port $76a$ of the select valve 76 is connected to an R range output port d of the manual valve 51, and the other input port $76b$ of the select valve 76 is connected to a line pressure output port $61a$ of the 2-3 shift valve 61, with an output port $76c$ of the select valve 76 being connected to the hydraulic servomotor C-2. Further, a first orifice 77 is provided between the output port $76c$ of the select valve 76 and the hydraulic servomotor C-2, while a second orifice 79 is provided between the input port $76b$ of the select valve 76 and the line pressure output port $61a$ of the 2-3 shift valve 61.

Operation of the present invention thus arranged will be described below.

In the D range condition, the manual valve 51 is changed over such that its ports p and a are communicated with each other for supplying the line pressure to both the solenoid valve $S_1$ and the 2-3 shift valve 61. Upon an upshift from the 2nd to the 3rd speed, since the solenoid valve $S_1$ is turned off, the 2-3 shift valve 61 is subjected at its control port $61b$ to the hydraulic pressure and changed over to take a left-half position as shown. Accordingly, the line pressure is supplied to the input port $76b$ of the select valve 76 via the output port $61a$ and the second orifice 79 to move a ball valve body $76d$ leftward on the drawing, so that the line pressure is supplied to the hydraulic servomotor C-2 via the output port $76c$ and the first orifice 77.

In the R range condition, the manual valve 51 is changed over such that its ports p and d are communicated with each other, while the port a is blocked off. The line pressure is hence supplied from the port d to the input port $76a$ of the select valve 76 for moving the ball valve body $76d$ rightward on the drawing, so that the line pressure is supplied to the hydraulic servomotor C-2 via the output port $76c$ and the first orifice 77.

Therefore, at the time of an upshift from the 2nd to the 3rd speed, the line pressure is supplied to the hydraulic servomotor C-2 while being restricted through both the second orifice 79 and the first orifice 77, with the result that the direct clutch $C_2$ is gradually connected so as to prevent the occurrence of a shift shock. Meanwhile, at the time of a shift into the reverse position, the line pressure is supplied to the hydraulic servomotor C-2 while being restricted through only the first orifice 77, with the result that the direct clutch $C_2$ is more quickly connected so as to prevent a time lag in speed change.

Although the present invention has been applied to the direct clutch $C_2$ in the foregoing embodiment, it is applicable to any of the clutches or brakes which is to be commonly used for different modes of speed change.

It should be understood that the present invention is not limited to the embodiment as mentioned above, and various modifications can be made based on the substance of the present invention without departing from the scope of the invention.

What we claim is:

1. A hydraulic control system in an automatic transmission comprising:
    a frictional engaging element for engaging and disengaging an element of a gear mechanism;
    a hydraulic servo for operating the frictional engaging element;
    shift change means connected to the hydraulic servo for supplying hydraulic fluid to the hydraulic servo and draining hydraulic fluid therefrom;
    a select valve for selectively supplying hydraulic fluid to the hydraulic servo through the shift change means, said select valve having:
        a first input port connected to the shift change means for supplying a hydraulic fluid to said select valve in forward,
        a second input port connected to the shift change means for supplying a hydraulic fluid to said select valve in reverse, and
        an output port connected to the hydraulic servo for supplying a hydraulic fluid to said hydraulic servo and selectively communicating with said first input port in forward and with said second input port in reverse;

first orifice means provided between said first input port and said shift change means for supplying hydraulic fluid to said first input port in forward at a pressure less than that to the second input port in reverse; and second orifice means provided between said output port and said hydraulic servo;

whereby said orifice means prevents shock in forward and in reverse.

2. A hydraulic control system according to claim 1 wherein said shift change means comprises:

a manual valve for supplying the hydraulic fluid to the hydraulic servo in forward and in reverse, and a shift valve disposed between the manual valve and said first input port for selectively providing hydraulic communication between said manual valve and said first input port in forward, said first orifice means being located between said first input port and said shift valve.

3. A hydraulic control system according to claim 1, wherein said first and second orifice means are orifices.

4. A method for controlling an automatic transmission comprising a hydraulic servo for a clutch or brake adapted to engage and disengage an element of a gear mechanism, and a select valve for selectively supplying hydraulic pressure to said hydraulic servo dependent on selection of forward or reverse, comprising:

supplying line pressure to said hydraulic servo through a first orifice and a second orifice connected in series while in forward; and supplying line pressure to said hydraulic servo only through said first orifice while in reverse.

* * * * *

UNITED STATES PATENT AND TRADEMARK OFFICE
CERTIFICATE OF CORRECTION

PATENT NO. : 5,050,459
DATED : September 24, 1991
INVENTOR(S) : ISHIKAWA et al

It is certified that error appears in the above-identified patent and that said Letters Patent is hereby corrected as shown below:

On the title page, Item [73]

"Assignees: "Alsin-Aw Kabushiki Kaisha;" should read --Assignees: Aisin-AW Kabushiki Kaisha;--.

Please substitute the following abstract for the abstract printed on the face of the patent:

A hydraulic control system for an automatic transmission includes a hydraulic servo for a clutch or brake adapted to engage and disengage an element in a planetary gear mechanism and a shift changer for supplying hydraulic fluid to and draining hydraulic fluid from the hydraulic servo. A select valve selectively supplies hydraulic pressure to the hydraulic servo through the shift changer dependent on the transmission state. The select valve has two input ports selectively supplied with hydraulic pressure dependent on the transmission

UNITED STATES PATENT AND TRADEMARK OFFICE
CERTIFICATE OF CORRECTION

PATENT NO. : 5,050,459
DATED : September 24, 1991
INVENTOR(S) : ISHIKAWA et al It is certified that error appears in the above-identified patent and that said Letters Patent is hereby corrected as shown below:

state and one output port for outputting hydraulic pressure to the shift changer and hydraulic servo. To reduce shock, a first orifice is disposed between an input port and the shift changer servo and a second orifice is disposed between the output port and the hydraulic servo.

Signed and Sealed this

Ninth Day of March, 1993

*Attest:*

STEPHEN G. KUNIN

*Attesting Officer*  *Acting Commissioner of Patents and Trademarks*